(12) United States Patent
Lutz et al.

(10) Patent No.: US 9,868,200 B2
(45) Date of Patent: Jan. 16, 2018

(54) HANDHELD POWER TOOL

(71) Applicant: Robert Bosch GmbH, Stuttgart (DE)

(72) Inventors: Manfred Lutz, Filderstadt (DE);
Florian Esenwein,
Leinfelden-Echterdingen (DE); Joern Stock, Bempflingen (DE); Joerg Maute, Sindelfingen (DE); Joachim Schadow, Stuttgart (DE); Daniel Barth,
Leinfelden-Echterdingen (DE);
Cornelius Boeck, Kirchheim (DE)

(73) Assignee: Robert Bosch GmbH, Stuttgart (DE)

( * ) Notice: Subject to any disclaimer, the term of this patent is extended or adjusted under 35 U.S.C. 154(b) by 425 days.

(21) Appl. No.: 14/606,824

(22) Filed: Jan. 27, 2015

(65) Prior Publication Data
US 2015/0209951 A1 Jul. 30, 2015

(30) Foreign Application Priority Data

Jan. 27, 2014 (DE) .......................... 10 2014 201 436

(51) Int. Cl.
*B25F 5/02* (2006.01)
*B23Q 17/00* (2006.01)

(52) U.S. Cl.
CPC ................ *B25F 5/02* (2013.01); *B23Q 17/00* (2013.01)

(58) Field of Classification Search
CPC .................................. B25F 5/02; B23Q 17/00
USPC ..................... 173/18, 20, 216, 217
See application file for complete search history.

(56) References Cited

U.S. PATENT DOCUMENTS

| | | | | |
|---|---|---|---|---|
| 3,611,095 A | * | 10/1971 | Schnizler | B23B 45/02 310/50 |
| 4,280,026 A | * | 7/1981 | Alessio | H01H 3/20 200/321 |
| 4,410,846 A | | 10/1983 | Gerber et al. | |
| 5,692,574 A | * | 12/1997 | Terada | B25D 17/043 173/162.2 |
| 6,968,759 B2 | * | 11/2005 | Becker | B25B 23/1425 73/862.23 |
| 7,217,178 B2 | * | 5/2007 | Oki | B25F 5/006 451/358 |
| 7,534,165 B2 | * | 5/2009 | Milbourne | B24B 23/00 451/259 |
| 2006/0113098 A1 | * | 6/2006 | Inagawa | B24B 23/028 173/162.2 |

(Continued)

FOREIGN PATENT DOCUMENTS

| | | |
|---|---|---|
| DE | 29 33 355 A1 | 3/1981 |
| DE | 42 04 420 A1 | 8/1993 |

(Continued)

*Primary Examiner* — Nathaniel Chukwurah
(74) *Attorney, Agent, or Firm* — Maginot, Moore & Beck LLP

(57) ABSTRACT

A handheld power tool includes at least one housing unit that has at least one housing element, at least one further housing element, and at least one housing connecting element that connects the housing element and the further housing element to one another. The handheld power tool also includes at least one electrical and/or electronic indication unit that has at least one at least partially circumferentially arranged indication element configured to indicate at least one handheld power tool characteristic variable. The indication element is formed at least partially integrally with the housing connecting element.

10 Claims, 4 Drawing Sheets

(56) References Cited

U.S. PATENT DOCUMENTS

2006/0220612 A1 10/2006 Feldmann et al.
2007/0295521 A1* 12/2007 Wiker .................. B24B 23/028
   173/162.1

FOREIGN PATENT DOCUMENTS

| DE | 43 18 980 A1 | 12/1994 |
| DE | 10 2006 005 140 A1 | 11/2007 |
| DE | 10 2011 089 343 A1 | 6/2013 |
| EP | 2 474 391 A1 | 7/2012 |
| GB | 2 426 378 A | 11/2006 |
| JP | 60-99508 A | 6/1985 |
| WO | 2012/134469 A1 | 10/2012 |

* cited by examiner

HANDHELD POWER TOOL

This application claims priority under 35 U.S.C. §119 to patent application no. DE 10 2014 201 436.0, filed on Jan. 27, 2014 in Germany, the disclosure of which is incorporated herein by reference in its entirety.

BACKGROUND

DE 43 18 980 A1 has already disclosed a handheld power tool which comprises a housing unit which has a housing element, a further housing element and a housing connecting element which connects the housing element and the further housing element to one another. Furthermore, the handheld power tool of DE 43 18 980 A1 has an electrical and/or electronic indication unit which has a circumferentially arranged indication element for indicating a handheld power tool characteristic variable.

SUMMARY

The disclosure is based on a handheld power tool having at least one housing unit which comprises at least one housing element, at least one further housing element and at least one housing connecting element which connects the housing element and the further housing element to one another, and having at least one electrical and/or electronic indication unit which has at least one at least partially circumferentially arranged indication element for indicating at least one handheld power tool characteristic variable.

It is proposed that at least the indication element be formed at least partially integrally with the housing connecting element. In this case, the housing element is preferably connected directly to the further housing element via the indication element. It is preferably the case that, in an assembled state, the indication element is arranged so as to be visible between the housing element and the further housing element. In this case, the housing connection element may be formed as a detent projection, as an intermediate housing element, as a clamping connection element, as a housing web or as some other housing connecting element which appears expedient to a person skilled in the art and which is provided for connecting the housing element and the further housing element to one another. Here, a "handheld power tool" should be understood in particular to mean a power tool for machining workpieces, which power tool can be transported by an operator without the use of a transportation machine and, in particular, can be held by an operator using at least one hand during the machining of a workpiece. The handheld power tool has in particular a mass of less than 40 kg, preferably less than 10 kg and particularly preferably less than 5 kg. In a preferred refinement, the handheld power tool is designed as an angle grinder. It is however also conceivable for the handheld power tool to be of some other configuration that would appear expedient to a person skilled in the art, for example a configuration as a power drill, a jigsaw, a saber saw, a hammer drill and/or chipping hammer, a battery-powered screwdriver, a planing machine, a grinding machine or the like.

The housing unit of the handheld power tool preferably has a gearing housing and a motor housing. The housing element preferably forms the motor housing. The further housing element preferably forms the gearing housing. The gearing housing is preferably at least partially formed from a metallic material. The motor housing is preferably at least partially formed from a plastic. In an alternative embodiment of the handheld power tool, however, it is also conceivable for the housing unit to have a combination housing which is provided for accommodating and/or mounting a drive unit and/or an output unit of the handheld power tool. "Provided" should be understood in particular to mean specially designed and/or specially equipped. The statement that an element and/or a unit are/is provided for a particular function should be understood in particular to mean that the element and/or the unit performs(s) and/or execute(s) said particular function in at least one usage and/or operating state. The housing unit may have a shell type of construction or pot type of construction or may have a combination of a shell type of construction and a pot type of construction. The gearing housing is preferably connected to the motor housing by means of the indication element, which is formed at least partially integrally with the housing connecting element. In this case, the gearing housing is preferably fixed to the motor housing by means of the indication element, which is formed at least partially integrally with the housing connecting element. Thus, the housing element and the further housing element are detachably fixed to one another by means of the indication element, which is formed at least partially integrally with the housing connecting element. The indication element, which is formed at least partially integrally with the housing connecting element, is in this case preferably arranged, as viewed along a main extent direction of the handheld power tool, between the housing element, in particular the motor housing, and the further housing element. To fix the housing element to the further housing element, the indication element, which is formed at least partially integrally with the housing connecting element, is preferably fixed by way of one side to the housing element and by way of a further side to the further housing element. "Integrally" should be understood in particular to mean at least cohesively connected, for example by means of a welding process, an adhesive bonding process, a molding-on process and/or some other process that appears expedient to a person skilled in the art, and/or advantageously molded in one piece, for example by production from one casting and/or by production in a single-component or multi-component injection molding process, and advantageously from a single blank.

The indication element is preferably arranged on the housing unit in a region between at least one operating element of an operating unit of the handheld power tool and a tool receptacle of the handheld power tool. Here, an "operating unit" should be understood in particular to mean a unit which has at least one component which is directly actuable by an operator and which is provided for influencing and/or modifying a process and/or a state of a unit, which is coupled to the operating unit, by way of an actuation and/or an input of parameters. The operating unit is preferably provided at least for energizing and/or interrupting a supply of power to the drive unit of the handheld power tool. The operating element is preferably in the form of a switch-actuating element which actuates an electrical switch for the purpose of energizing and/or interrupting a supply of power to the drive unit of the handheld power tool. In this case, the operating element may be mounted so as to be movable in pivotable, rotatable and/or translational fashion. Furthermore, it is preferably the case that characteristic variables of the handheld power tool can be adjusted and/or varied by means of the operating unit. It is conceivable here for a rotational speed of the drive unit, a torque of the drive unit, a starting torque etc. to be adjustable and/or variable by means of the operating unit.

The expression "tool receptacle" should be understood in particular to mean an element or a unit of the handheld power tool to which a machining tool can be detachably fastened in order to be driven by means of at least one drive unit of the handheld power tool. The tool receptacle is preferably provided for rotationally conjointly receiving the machining tool. Thus, the tool receptacle preferably comprises at least one rotary driving element. The rotary driving element is preferably provided for a transmission of torque to the machining tool. In this case, the rotary driving element is preferably connectable to the machining tool in positively locking and/or non-positively locking fashion. The rotary driving element is preferably connected rotationally conjointly to an output spindle of the handheld power tool. It is however also conceivable for the tool receptacle to be fixedly connectable to the machining tool for a translational transmission of force, in particular for a translational transmission of drive force.

An "electrical and/or electronic indication unit" should be understood in particular to mean a unit by means of which a visually variable signal can be output and/or which, in at least one indication state, outputs at least one signal that is visible to a person. The indication element itself may in this case be formed as a luminous element cover, for example a light conductor, as a reflector, as a luminous element, for example an individual LED, as a printed circuit board with multiple LEDs, and/or as a backlit indication unit, in particular as a matrix indication unit, for example as an LCD display, an OLED display and/or as electronic paper (E-paper, E-Ink). The handheld power tool may furthermore comprise, in addition to the indication unit, at least one acoustic and/or haptic output unit for outputting information to an operator. In a preferred refinement of the handheld power tool, the indication unit comprises at least one projection unit which is provided for projecting at least one handheld power tool characteristic variable onto a machining tool arranged on the tool receptacle. It is advantageously possible for information to be output to an operator directly in a working area of the handheld power tool. Furthermore, by means of the projection unit, it is advantageously possible for machining tool wear to be depicted in that, for example, there can be projected onto the machining tool a colored marking which changes during the machining of a workpiece, in particular as a result of a decrease of a diameter of a machining tool of disk-shaped form.

Here, the expression "at least partially circumferentially arranged" should be understood in particular to mean an arrangement of at least one element and/or of a unit relative to a further element and/or a further unit, wherein a maximum extent of the element and/or of the unit along a circumferential direction corresponds to at least 5% of a maximum circumferential extent of the further element and/or of the further unit. Thus, the indication element, viewed along the circumferential direction, preferably has a maximum extent which is in particular greater than 5% of a maximum circumferential extent of the housing unit, preferably greater than 8% of the maximum circumferential extent of the housing unit and particularly preferably greater than 15% of the maximum circumferential extent of the housing unit. The circumferential extent runs preferably in a plane extending at least substantially perpendicular to a main extent direction of the handheld power tool and/or at least substantially perpendicular to an axis of rotation of the drive unit of the handheld power tool. Here, the expression "substantially perpendicular" is intended in particular to define an orientation of a direction relative to a reference direction, wherein the direction and the reference direction, viewed in particular in a plane, enclose an angle of 90°, and the angle has a maximum deviation of in particular less than 8°, advantageously less than 5° and particularly advantageously less than 2°. It is particularly preferably the case that the main extent direction of the handheld power tool runs at least substantially parallel to the axis of rotation of the drive unit of the handheld power tool and/or to a movement axis of an output unit of the handheld power tool. Here, "substantially parallel" should be understood in particular to mean an orientation of a direction relative to a reference direction, in particular in a plane, wherein the direction has a deviation of in particular less than 8°, advantageously less than 5° and particularly advantageously less than 2° relative to the reference direction.

By means of the embodiment of the handheld power tool according to the disclosure, it is advantageously possible for assembly outlay, assembly costs and structural space to be saved. It is furthermore possible to realize a compact arrangement of the indication element on the housing unit. In this case, an arrangement of the indication unit, in particular of the indication element, in a region of the housing unit which is clearly visible to an operator during machining of a workpiece by means of the handheld power tool can advantageously be made possible. Furthermore, additional benefit of the housing connecting element can advantageously be achieved in that it is made possible for handheld power tool characteristic variables to be able to be indicated by means of the indication element, which is formed at least partially integrally with the housing connecting element. Thus, advantageous outputting of information to an operator can be made possible. An operator of the handheld power tool can thus be advantageously provided with information regarding a wide variety of characteristic variables of the handheld power tool and/or states of the handheld power tool by means of the indication unit. Furthermore, the indication element can advantageously be used as an operator guide, in order to achieve that the handheld power tool can be operated in a self-explanatory manner.

It is furthermore proposed that, to connect the housing element and the further housing element, the indication element be fixable in positively locking and/or non-positively locking fashion to the housing element and/or to the further housing element. In this case, the indication element can be fixed to the housing element and/or to the further housing element by means of a clamping connection, by means of a detent connection, by means of a screw connection or some other connection that appears expedient to a person skilled in the art. It is preferably the case that the indication element can, by way of at least one side, be fixed in positively locking and/or non-positively locking fashion to the housing element and can, by way of at least one further side, be fixed in positively locking and/or non-positively locking fashion to the further housing element. By means of the embodiment according to the disclosure, it is possible to realize a connection of the housing element and of the further housing element, in particular fixing of the housing element to the further housing element, in a simple manner in terms of construction.

It is furthermore proposed that the indication element have at least one positive-locking projection which, to fix the housing element and the further housing element, interacts with a corresponding positive-locking projection of the housing element and/or of the further housing element. The positive-locking projection of the indication element preferably engages behind the corresponding positive-locking projection of the housing element and/or of the further housing element. To fix the housing element to the further housing element, the indication element preferably has at least two positive-locking projections. Here, it is preferably the case that one of the two positive-locking projections is arranged on one side of the indication element, and one of the two positive-locking projections is arranged on a further side of the indication element facing away from the former side. By means of the embodiment according to the disclosure, it is advantageously possible to realize secure fixing of the indication element to the housing element and/or to the further housing element. Furthermore, secure fixing of the housing element to the further housing element can be advantageously realized by means of the indication element.

It is furthermore proposed that, to connect the housing element and the further housing element, the indication element be fixed cohesively to the housing element and/or to the further housing element. In this case, the indication element may be fixed cohesively to the housing element and/or to the further housing element by means of an injection molding process, in particular a two-component injection molding process, by means of an adhesive bonding process, by means of a welding process, by means of a stamping process, in particular a hot stamping process, or the like. Thus, the indication element is preferably formed at least partially integrally with the housing element and/or with the further housing element. By means of the embodiment according to the disclosure, it is advantageously possible to realize a stable arrangement of the indication element on the housing element and/or on the further housing element. Furthermore, it is advantageously possible to dispense with separate fixing means for fixing the indication element to the housing element and/or to the further housing element.

It is furthermore proposed that, viewed along a direction running at least substantially perpendicular to a connecting direction of the housing unit, the indication element extend through the housing element and/or through the further housing element. A connecting direction preferably runs at least substantially parallel to the main direction of extent of the handheld power tool. Thus, the connecting direction runs at least substantially parallel to the axis of rotation of the drive unit. The housing element and the further housing element are preferably connectable to one another along the connecting direction. Furthermore, fixing forces for fixing the housing element and the further housing element by means of the indication element act at least substantially along the connecting direction. It is thus advantageously possible for electronics and/or an illumination unit of the indication unit for activation and/or illumination of the indication element to be arranged within the interior space, surrounded by the housing element and/or by the further housing element, of the handheld power tool, while it is advantageously ensured that the indication element can be distinguished and/or read off from an outer side of the handheld power tool. Thus, it is for example advantageously possible to realize expedient protection of the electronics and/or of an illumination unit of the indication unit in a simple manner in terms of construction.

It is furthermore proposed that the indication element be in the form of an electrical and/or electronic graphic indication element. Here, a "graphic indication element" should be understood in particular to mean an element by means of which alphabetic characters, diagrams, symbols, pictograms, images, films etc. can be visually depicted. Here, the graphic indication element may be formed as a line display, as a multi-line display, as an LCD, as an AMOLED, as an LED display, as a color display, as at least five interconnected LED-type luminous strips or as some other graphic indication element that appears expedient to a person skilled in the art. The graphic indication element is particularly preferably in the form of a touch-sensitive display. It is however also conceivable for the touch-sensitive graphic indication element to be of some other configuration that appears expedient to a person skilled in the art. By means of the embodiment according to the disclosure, a handheld power tool characteristic variable can be indicated to an operator in a particularly advantageous manner. It is thus advantageously possible for information to be output to an operator in a clear, understandable and unambiguously attributable manner. It is thus furthermore also possible for complex information to be output. Furthermore, in the case of the graphic indication element being embodied as a touch-sensitive graphic indication element, it is advantageously possible for an operator to react directly to information indicated on the graphic indication element by actuating the touch-sensitive graphic indication element. Convenient operation of the handheld power tool can thus be advantageously achieved. By means of the embodiment according to the disclosure, it is possible for a graphic indication element for indicating alphabetic characters, diagrams, symbols, pictograms, images, films etc. to be realized in a simple manner in terms of construction.

It is furthermore proposed that the electrical and/or electronic graphic indication element be of at least five-line configuration. It is thus advantageously possible for at least numeric characters and alphabetic characters to be displayed by means of the electrical and/or electronic graphic indication element, which can be used for operator guidance.

It is furthermore proposed that the indication element be arranged on the housing unit close to an output. Here, the expression "arranged close to an output" should be understood in particular to mean an arrangement of at least one element and/or one unit relative to an output unit of the handheld power tool, in particular relative to an output movement axis of the output unit, wherein a minimum spacing between the element and/or the unit and the output unit, in particular to the output movement axis, is in particular less than 100 mm, preferably less than 50 mm and particularly preferably less than 30 mm Thus, the indication element preferably has a minimal spacing to the output unit, in particular to the output movement axis, of in particular less than 100 mm, preferably less than 50 mm and particularly preferably less than 30 mm Here, the indication element is particularly preferably arranged on the gearing housing of the housing unit, in particular on a side of the gearing housing facing toward the motor housing. By means of the design according to the disclosure, an arrangement of the indication unit, in particular of the indication element, can advantageously be made possible in a region of the housing unit which is easily visible to an operator during the machining of a workpiece by means of the handheld power tool. It is thus advantageously possible for an operator to be conveniently provided with information regarding a wide variety of states of the handheld power tool during the machining of a workpiece.

It is furthermore proposed that the indication element extend around the housing unit over at least 25% of a maximum overall circumferential extent of the housing unit. Thus, the indication element preferably has a maximum extent along the circumferential direction which corresponds to at least 25% of the maximum overall circumferential extent of the housing unit. In particular, the indication element extends around the housing unit at least over 30% of the maximum overall circumferential extent of the housing unit, preferably at least over 50% of the maximum circumferential extent of the housing unit and particularly preferably at least over 70% of the maximum overall circumferential extent of the housing unit. In a particularly preferred embodiment of the handheld power tool, the indication element extends all the way around the housing unit. By means of the embodiment according to the disclosure, it can advantageously be made possible for the indication element to be viewed from different viewing angles.

It is furthermore proposed that the indication element terminate at least substantially flush with an outer surface of the housing unit. Here, "terminates at least substantially flush" should be understood in particular to mean an arrangement of the indication element on the housing unit wherein the indication element extends in particular less than 10 mm, preferably less than 5 mm and particularly preferably less than 2 mm over the outer surface, in particular viewed along a direction running from an inner surface of the housing unit in the direction of the outer surface of the housing unit. The indication element is particularly preferably arranged in a receiving recess of the housing unit, and extends at a maximum to the outer surface of the housing unit, in particular viewed along a direction running from an inner surface of the housing unit in the direction of the outer surface of the housing unit. It is thus advantageously possible to realize a compact arrangement of the indication unit. Furthermore, the indication unit can be protected against damage in an advantageous manner.

Here, it is not the intention for the handheld power tool according to the disclosure to be restricted to the usage and embodiment described above. In particular, to perform a function described herein, the handheld power tool according to the disclosure may have a number of individual elements, components, units and/or method steps that differs from the number stated herein.

BRIEF DESCRIPTION OF THE DRAWINGS

Further advantages will emerge from the following description of the drawings. The drawings illustrate exemplary embodiments of the disclosure. The drawings, the description, and the claims contain numerous features in combination. A person skilled in the art will expediently also consider the features individually and combine them to form further meaningful combinations.

In the drawings.

DETAILED DESCRIPTION

Figure 1:
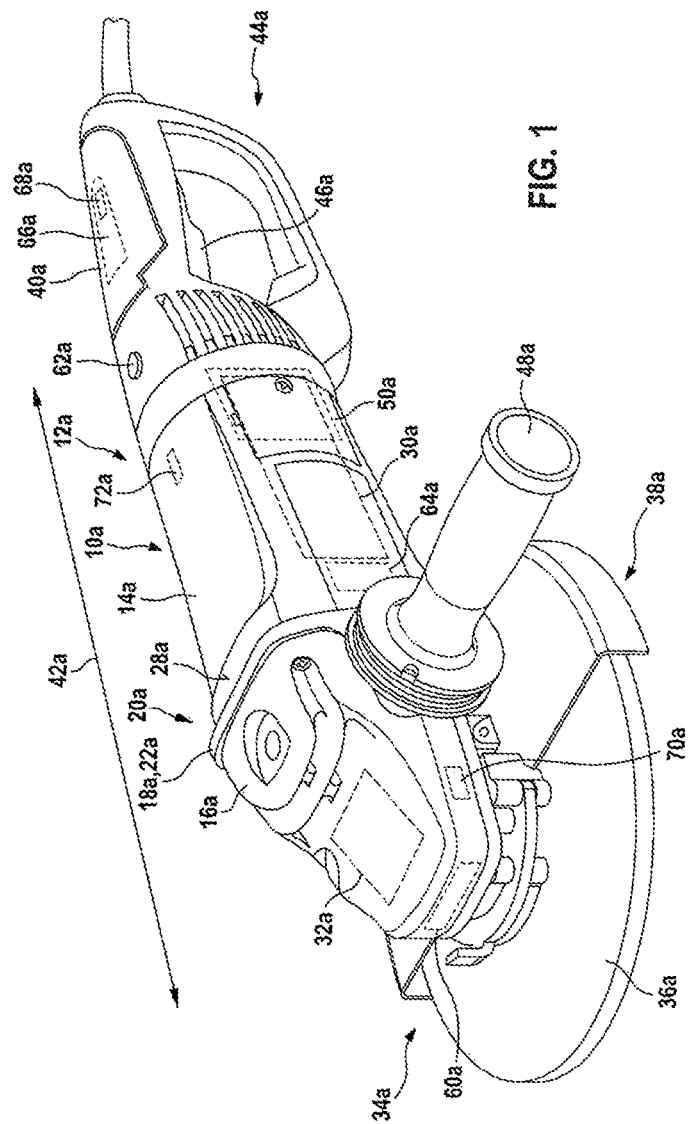
FIG. 1 is a schematic illustration of a handheld power tool according to the disclosure, which is in the form of an angle grinder.

FIG. 1 shows a handheld power tool 10a which is in the form of an angle grinder. Here, the handheld power tool 10a comprises at least one housing unit 12a which has at least one housing element 14a, at least one further housing element 16a and at least one housing connecting element 18a which connects the housing element 14a and the further housing element 16a to one another, and at least one electrical and/or electronic indication unit 20a which has at least one at least partially circumferentially arranged indication element 22a for indicating at least one handheld power tool characteristic variable. In this case, the housing element 14a is in the form of a motor housing of the handheld power tool 10a. Thus, the housing element 14a is provided for accommodating a drive unit 30a of the handheld power tool 10a. The drive unit 30a is in the form of a brushless electric motor unit. In this case, the drive unit 30a is in the form of an EC electric motor unit. It is however also conceivable for the drive unit 30a to be of some other configuration that appears expedient to a person skilled in the art. The further housing element 16a is in the form of a gearing housing of the handheld power tool 10a. Thus, the further housing element 16a is provided for accommodating an output unit 32a of the handheld power tool 10a. The drive unit 30a is provided for driving a machining tool 36a, which can be arranged on a tool receptacle 34a of the handheld power tool 10a, in rotation by way of the output unit 32a. The machining tool 36a is in this case in the form of a grinding disk. It is however also conceivable for the machining tool 36a to be in the form of a cutting or polishing disk. Furthermore, the handheld power tool 10a comprises at least one protective hood unit 38a. The protective hood unit 38a surrounds the machining tool 36a, when machining tool 36a is arranged on the tool receptacle 34a, at least along an angle range of greater than 120°. Furthermore, the handheld power tool 10a comprises at least one main handle 40a which, on a side of the housing element 14a facing away from the tool receptacle 34a, extends in the direction of a main extent direction 42a of the handheld power tool 10a. Furthermore, the handheld power tool 10a comprises at least one operating unit 44a which has at least one operating element 46a. The operating element 46a is arranged on the main handle 40a. Here, the operating element 46a is provided for energizing the drive unit 30a. An auxiliary handle 48a can furthermore be detachably arranged on the further housing element 16a. When the auxiliary handle 48a is arranged on the further housing element 16a, the auxiliary handle 48a extends at least substantially perpendicular to the main extent direction 42a of the handheld power tool 10a. The main extent direction 42a runs at least substantially parallel to an axis of rotation of the drive unit 30a.

Furthermore, the handheld power tool 10a comprises at least one control and/or regulation unit 50a which is provided at least for controlling and/or regulating the drive unit 30a. Furthermore, the control and/or regulation unit 50a is provided for controlling and/or regulating the indication unit 20a. Here, the indication unit 20a can be controlled and/or regulated by means of the control and/or regulation unit 50a in a manner dependent on a state, and/or in a manner dependent on a set operating mode, of the handheld power tool 10a. Thus, at least one item of information regarding the state, for example an optimum working range, an overload, a servicing requirement etc., and/or regarding the set operating mode, for example a power-saving mode, a standby mode, characteristic variables of an operating mode (rotational speed, torque etc.) etc., can be indicated to an operator by means of the indication unit 20a. Here, the information can be indicated by indication of different colors and/or by way of different indication modes, for example slow blinking, fast blinking, constant illumination etc., of the indication unit 20a. For indicating information, the indication unit 20a comprises at least the indication element 22a. Viewed along the main extent direction 42a, the indication element 22a is arranged on the housing unit 12a in a region between the operating element 46a and the tool receptacle 34a. In this case, the indication element 22a is arranged on the housing unit 12a close to an output. Thus, viewed along the main extent direction 42a, the indication element 22a has a minimal spacing to an output movement axis of an output element (not illustrated in any more detail here) in the form of an output spindle of the output unit 32a, said spacing being less than 100 mm Viewed along the main extent direction 42a, the indication element 22a is arranged between the housing element 14a and further housing element 16a. Thus, the indication element 22a is arranged adjacent to the housing element 14a and adjacent to the further housing element 16a. In this case, the indication element 22a may be arranged in a region of an air-guiding ring of a ventilation unit (not illustrated in any more detail here) of the handheld power tool 10a, or the indication element 22a itself forms the air-guiding ring.

The indication element 22a is in the form of a light conductor. It is however also conceivable for the indication element 22a to be of some other configuration that appears expedient to a person skilled in the art, for example a configuration as an LED-type luminous strip which has multiple LEDs arranged along a longitudinal extent of the indication element 22a. The indication element 22a terminates at least substantially flush with an outer surface 28a of the housing unit 12a. Thus, viewed along a direction running from an inner surface of the housing unit 12a in the direction of the outer surface 28a of the housing unit 12a, the indication element 22a extends at most 8 mm beyond the outer surface 28a of the housing unit 12a, or at most as far as the outer surface 28a of the housing unit 12a. Furthermore, the indication element 22a is of circular ring-shaped form. Thus, the indication element 22a extends around the housing unit 12a over at least 25% of a maximum overall circumferential extent of the housing unit 12a. The indication element 22a preferably extends at least substantially all the way around the housing unit 12a.

Figure 2:
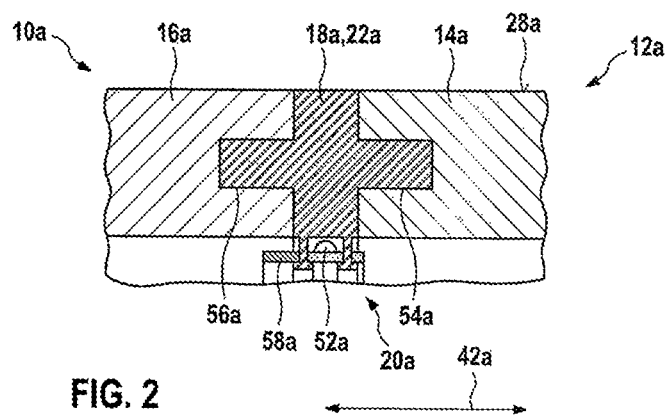
FIG. 2 is a schematic illustration, in a detail view, of an indication unit of the handheld power tool according to the disclosure.

For illumination of the indication element 22a, the indication unit 20a has at least one luminous element 52a (FIG. 2). The luminous element 52a is in this case in the form of an LED, in particular in the form of an RGB LED. Altogether, the indication unit 20a has a multiplicity of luminous elements 52a which are arranged so as to be distributed uniformly along a longitudinal extent. The luminous elements 52a thus form a luminous ring. It is however also conceivable for the luminous elements 52a to be arranged so as to be distributed non-uniformly along the longitudinal extent or the circumferential direction. The luminous elements 52a can be controlled and/or regulated individually by means of the control and/or regulation unit 50a. For this purpose, the luminous elements 52a are arranged together on a printed circuit board 58a of the indication unit 20a. The printed circuit board 58a is in the form of a flexible printed circuit board. Furthermore, the printed circuit board 58a is in circular ring-shaped form in the housing unit 12a. In this way, it is made possible for the indication element 22a to be illuminated along the entire longitudinal extent of the indication element 22a. It is furthermore made possible for the indication element 22a to be illuminated partially or in an encircling manner. The longitudinal extent of the indication element 22a extends at least substantially perpendicular to the main extent direction 42a of the handheld power tool 10a. Thus, the longitudinal extent of the indication element 22a extends along a circumferential direction of the handheld power tool 10a. In this case, the longitudinal extent of the indication element 22a extends in a plane running at least substantially perpendicular to the main extent direction 42a.

The indication element 22a is formed at least partially integrally with the housing connecting element 18a. In this case, the indication element 22a forms the housing connecting element 18a. To connect the housing element 14a and the further housing element 16a, the indication element 22a can be fixed in positively locking and/or non-positively locking fashion to the housing element 14a and/or to the further housing element 16a. To partially accommodate the indication element 22a, the housing element 14a comprises at least one recess 54a in which the indication element 22a can be at least partially arranged in positively locking and/or non-positively locking fashion. For this purpose, the indication element 22a comprises at least one fixing projection which, in an assembled state, engages into the recess 54a of the housing element 14a. To partially accommodate the indication element 22a, the further housing element 16a likewise comprises at least one recess 56a in which the indication element 22a can be at least partially arranged in positively locking and/or non-positively locking fashion. For this purpose, the indication element 22a comprises at least one further fixing projection which, in an assembled state, engages into the recess 56a of the further housing element 16a. In this case, the indication element 22a can be fixed to the housing element 14a and to the further housing element 16a by means of an interference fit. It is however also conceivable for the indication element 22a to be fixable to the housing element 14a and to the further housing element 16a by means of an adhesive connection etc. In an alternative embodiment, it is conceivable for the indication element 22a to have, as an alternative to the fixing projections, positive-locking projections (in this regard, cf. for example FIG. 4) which, to fix the housing element 14a and the further housing element 16a in positively locking and/or non-positively locking fashion, interact along the main extent direction 42a with in each case one corresponding positive-locking projection (in this regard, cf. for example FIG. 4) of the housing element 14a and/or of the further housing element 16a.

Furthermore, viewed along a direction running at least substantially perpendicular to a connecting direction of the housing unit 12a, the indication element 22a runs through the housing element 14a and/or through the further housing element 16a. Thus, viewed along the direction running at least substantially perpendicular to the connecting direction of the housing unit 12a, the indication element 22a has a greater extent than a material thickness of the housing element 14a and/or of the further housing element 16a. The printed circuit board 58a of the indication unit 20a is in this case arranged in an interior space, surrounded by the housing element 14a and the further housing element 16a, of the housing unit 12a. Furthermore, the printed circuit board 58a is fixed to the indication element 22a by means of a non-positively locking connection, by means of a positively locking connection and/or by means of a cohesive connection.

The indication unit 20a can be controlled and/or regulated by means of the control and/or regulation unit 50a such that a revolving light signal corresponding to the direction of rotation can be generated by means of the indication unit 20a. For this purpose, the luminous elements 52a, which illuminate the indication element 22a, can be activated by means of the control and/or regulation unit 50a. To indicate a rotational speed, the indication unit 20a can, by means of the control and/or regulation unit 50a, be controlled and/or regulated with regard to a color and with regard to a speed of revolution in a manner dependent on a rotational speed of the drive unit 30a. For example, a green and slowly revolving light signal can be generated by means of the indication unit 20a in the case of a low rotational speed. Furthermore, it is conceivable for a light intensity and/or an illuminated region of the indication unit 20a to likewise be variable in a manner dependent on the rotational speed. Furthermore, an overload of the drive unit 30a can be indicated for example by illumination of the entire indication unit 20a in one color and/or by means of a variation of a speed of revolution and/or by means of a color change. Furthermore, it is for example possible for an optimum operating point of the handheld power tool 10a to be indicated by means of the indication unit 20a through the indication of a light signal. In this case, it is conceivable for the control and/or regulation unit 50a to vary a light intensity, a speed of revolution, a color and/or an illuminated region of the indication unit 20a in a manner dependent on an optimum operating point of the handheld power tool 10a being approached. A standby mode of the handheld power tool 10a can be indicated for example by means of a uniform variation of a light intensity, for example by virtue of the brightness of the indication unit 20a increasing and decreasing again. Furthermore, it is conceivable that a speed of revolution and further characteristic variables of the indication unit 20a that would appear expedient to a person skilled in the art can be varied in order to indicate the standby mode. It is thus advantageously possible for information regarding a state and/or an operating mode of the handheld power tool 10a to be visually output to an operator in an advantageous manner.

Furthermore, the indication unit 20a comprises at least one projection unit 60a which is provided for projecting at least one handheld power tool characteristic variable onto the machining tool 36a arranged on the tool receptacle 34a. It is conceivable here for a rotational speed, a power level, an efficiency, a torque and/or other characteristic variables of the drive unit 30a and/or of the handheld power tool 10a to be projectable onto the machining tool 36a by means of the projection unit 60a. Furthermore, wear of the machining tool 36a can be indicated by means of the projection unit 60a. For this purpose, it is for example possible for a color scheme running from green to red to be projected onto a surface of the machining tool 36a by means of the projection unit 60a. An operator can thus advantageously identify the extent to which the machining tool 36a has worn, in particular the extent to which a diameter of the machining tool 36a has already decreased, in a manner dependent on a color of the color scheme that is presently visible on the surface of the machining tool 36a.

Furthermore, the operating unit 44a comprises at least one operating mode setting element 62a by means of which an operating mode can be manually set. For example, a power-saving mode of the handheld power tool 10a can be activated by means of the operating mode setting element 62a. The power-saving mode can be output to a user for example by means of green illumination of the indication unit 20a, in particular of the indication element 22a, which can be illuminated by means of the luminous elements 52a. Thus, in the power-saving mode, operation of the handheld power tool 10a can be indicated to an operator by means of the indication element 22a. Furthermore, by means of the projection unit 60a, it is possible for an optimum operating range in the power-saving mode to be indicated, for example an optimum rotational speed, an optimum contact pressure, an optimum torque etc., at which maximum work progress can be achieved with low power consumption. For indication of an optimum contact pressure, the indication unit 20a may comprise, in addition to the indication element 22a and in addition to the luminous elements 52a, a single LED (not illustrated in any more detail here) which is provided for indicating to an operator the attainment and/or overshooting of an optimum contact pressure. For this purpose, it is for example that the LED is illuminated green when an optimum contact pressure is attained, is illuminated red in the event of the optimum contact pressure being overshot, and is illuminated blue in the event of the optimum contact pressure being undershot. An operator is thus advantageously provided with feedback with regard to his or her working technique. In this case, the projection unit 60a may be activatable manually by an operator. It is however also conceivable for the projection unit 60a to be automatically activatable in a manner dependent on at least one handheld power tool characteristic variable.

The handheld power tool 10a furthermore comprises at least one drive unit sensor unit 64a for the detection of at least one drive unit characteristic variable. The drive unit characteristic variable is in this case in the form of a drive unit current, a drive unit voltage, a drive unit power or the like. The drive unit characteristic variable can be evaluated by means of the control and/or regulation unit 50a for an automatic activation of the power-saving mode. Here, a drive unit characteristic variable, in particular a drive unit power or a drive unit current, is detected by means of the drive unit sensor unit 64a over a predefined time period. The control and/or regulation unit 50a averages the detected values over the time period in order to calculate a mean value. The control and/or regulation unit 50a activates the power-saving mode in a manner dependent on the average value that is calculated. Here, the control and/or regulation unit 50a evaluates whether an operator demands a high level of power of the drive unit 30a or the handheld power tool 10a is being operated in a value range which corresponds to the power-saving mode. If operation in a value range of the power-saving mode is detected, the power-saving mode can be automatically activated by the control and/or regulation unit 50a. Here, it is also conceivable that the drive unit sensor unit 64a detects a drive unit characteristic variable throughout the operation of the handheld power tool 10a, and that the drive unit characteristic variable detected by means of the drive unit sensor unit 64a is processed by the control and/or regulation unit 50a throughout operation. Here, the control and/or regulation unit 50a activates an operating mode of the handheld power tool 10a in a manner dependent on the detected drive unit characteristic variable. If the control and/or regulation unit 50a detects for example operation of the drive unit 30a with a demand for high power over a long period of time, the control and/or regulation unit 50a automatically activates a corresponding operating mode which differs from the power-saving mode.

In the power-saving mode, the power of the drive unit 30a is restricted to a limit value. In this way, it is advantageously the case that, in the power-saving mode, cooling of the drive unit 30a is possible by convection alone, in order, for example, to advantageously reduce power consumption of a fan unit. In this way, it is advantageously possible for an efficiency of the handheld power tool 10a at maximum possible load to be increased. It is particularly advantageous for the power to be limited to a value between 75% and 110% of a rated power of the drive unit 30a, in particular to a value between 90% and 100% of the rated power of the drive unit 30a. An interruption in machining of a workpiece, and/or a removal from a workpiece, are preferably disregarded in terms of an automatic activation of operating modes of the handheld power tool 10a. It is advantageously possible for inadvertent switching into a low-power operating mode to be prevented. In the case of automatic operating mode activation by means of the control and/or regulation unit 50a, it is expedient, in particular if drive unit characteristic variables are detected throughout operation, not to restrict a drive unit power output, in order that disadvantageous determination of step changes in load is advantageously avoided.

Alternatively or in addition to the drive unit sensor unit 64a, the handheld power tool 10a comprises at least one operator sensor unit 66a for detecting at least one operator-specific characteristic variable. The operator-specific characteristic variable can be evaluated by means of the control and/or regulation unit 50a for the purpose of automatic activation of the power-saving mode. Here, the operator-specific characteristic variable may be in the form of an operator-exerted pressing force, an operator-exerted advancing force, an operator-exerted holding force, an operator-specific load type, an operator usage situation, an operator-exerted contact pressure, a position of at least one hand of the operator etc., or in the form of some other operator-specific characteristic variable that appears expedient to a person skilled in the art. The operator-specific characteristic variable is preferably in the form of an operator-exerted contact pressure. For a detection of the operator-specific characteristic variable, the operator sensor unit 66a comprises at least one operator sensor element 68a. The operator sensor element 68a is arranged on the main handle 40a. In this case, the operator sensor element 68a is in the form of a pressure detection foil. Here, the operator sensor element 68a may also be arranged at a connecting point between a vibration-damped handle surface and the main handle 40a in order to detect bending at the connecting point, which can be utilized for the determination of the operator-exerted contact pressure. In this way, an operator-exerted contact pressure can be detected by means of the operator sensor element 68a. Alternatively or in addition, the operator sensor unit 66a comprises at least one further operator sensor element 70a for determining an operator-exerted contact pressure. Here, the further operator sensor element 70a is in the form of a pressure sensor which is arranged in the region of a bearing point of the output element, in the form of an output spindle, of the output unit 32a. Here, the further operator sensor element 70a is in the form of a strain gauge which detects an elastic deformation in the region of the bearing point. From this, an operator-exerted contact pressure can be determined by means of the control and/or regulation unit 50a. It is however also conceivable for the further operator sensor element 70a to be in the form of a rolling bearing element with integrated force detection sensor means.

The control and/or regulation unit 50a is provided for detecting an operator-exerted contact pressure throughout the operation of the handheld power tool 10a and for averaging measurement values obtained therefrom over a time period of a maximum of 5 seconds. From this, it is possible to evaluate whether an operator demands a high level of power during the machining of a workpiece or whether energy-efficient machining is preferable. Owing to an operator-exerted contact pressure being detected as an input variable, a maximum power in the power-saving mode can be determined because, here, the control variable is not equal to an input variable. To take into consideration a friction coefficient and other specific variables of the machining tool 36a, it is advantageous if the operator-exerted contact pressure is set in a ratio with respect to a power output of the handheld power tool 10a for a time period of a few seconds after commencement of machining of a workpiece. For example, a low friction coefficient leads to low power with a high operator-exerted contact pressure. Furthermore, a measurement of the ratio and/or of the operator-exerted contact pressure at intervals during operation may advantageously be taken into consideration for the purpose of determining the wear of the machining tool 36a. A factor of the ratio between the operator-exerted contact pressure and a power level can advantageously be taken into consideration for automatic operating mode selection by means of the control and/or regulation unit 50a.

For an increase in efficiency, in the power-saving mode of the handheld power tool 10a, an idle rotational speed of the drive unit 30a can be limited by means of the control and/or regulation unit 50a. In this case, the idle rotational speed can be limited to a value at which the drive unit 30a can be operated with optimum efficiency. An optimum rotational speed of the drive unit 30a is dependent on a characteristic map of the drive unit 30a. The optimum efficiency of the drive unit 30a is preferably in a rotational speed range from 55% to 75% of a maximum rotational speed of the drive unit 30a. Power can advantageously be saved by means of a reduced idle rotational speed. When a workpiece is machined by means of the machining tool 36a in a rated power range, the machining tool 36a reaches a rotational speed which is lower than the maximum idle rotational speed of the drive unit 30a. The rotational speed of the machining tool 36a is in this case dependent on an operator-exerted contact pressure. Thus, during the machining of a workpiece, a rotational speed can fluctuate between an idle rotational speed and a load rotational speed. An acceleration of the machining tool 36a to the idle rotational speed after a removal of the handheld power tool 10a from a workpiece requires a large amount of power, which can be saved by virtue of the idle rotational speed being limited such that the idle rotational speed is as close as possible to the optimum operating point of the handheld power tool 10a. As an additional function, it is conceivable for the control and/or regulation unit 50a to learn the operating point at which an operator is working and, on the basis thereof, to determine an optimum idle rotational speed which yields the smallest difference in relation to an average load rotational speed. In this way, it is advantageously possible to achieve at least substantially constant rotational speed over an entire period of machining usage. A combination of a power limitation and a rotational speed limitation in the power-saving mode advantageously permits optimized efficiency with low consumption.

Furthermore, in the power-saving mode, an air guide of the fan unit of the handheld power tool 10a can be optimized by means of the control and/or regulation unit 50a such that a low level of power can be expended for ventilation and/or cooling purposes. It is furthermore conceivable to use multiple fan units which can be controlled and/or regulated by means of the control and/or regulation unit 50a in a manner dependent on a cooling power demand. It is thus advantageously the case that cooling is performed in regions which have exceeded a predefined temperature threshold. For this purpose, fan units are arranged for example at power transistors, at the drive unit 30a, at a handle surface etc. It is however also conceivable for the handheld power tool 10a to comprise multiple heat pipes, multiple regulated and/or controlled flaps etc. for controlling and/or regulating a cooling power demand.

Furthermore, in the activated power-saving mode, a gearing transmission ratio of the output unit 32a is adaptable. By means of a variation of the gearing transmission ratio, it is advantageously possible to realize that, for a constant operator-exerted contact pressure and thus torque required at the output element in the form of an output spindle, the drive unit 30a can be operated with advantageous efficiency. To make it possible to realize a gearing transmission ratio, the output unit 32a may be designed for example as a belt drive with adjustable cone pulleys, as a thrust belt gear mechanism, as a cone ring transmission or the like.

Furthermore, in the power-saving mode of the handheld power tool 10a, a switching frequency of an inverter (not illustrated in any more detail here) of the drive unit 30a can be adapted by means of the control and/or regulation unit 50a. The inverter for activation of the drive unit 30a has at least one power transistor, for example a MosFET or an IGBT, which generates a pulse-width-modulated alternating current from a direct-current voltage with a high switching frequency. The pulse-width-modulated alternating current can be smoothed by inductivities of motor coils of the drive unit 30a. In this way, it is possible to generate a sinusoidal alternating current of variable frequency and voltage which is provided for generating a rotary field for driving the drive unit 30a. Common switching frequencies for the power transistor are 2 kHz, 4 kHz, 8 kHz, 16 kHz, 20 kHz and 24 kHz. The high switching frequencies of 16 kHz to 24 kHz advantageously lie outside the range of human hearing and thus advantageously generate low noise emissions. The high switching frequencies can advantageously be utilized for generating a sinusoidal frequency for the rotary field of the drive unit 30a. Here, a minimum switching frequency for the rotary field is proportional to a number of poles of the drive unit 30a and to a maximum rotational speed of the drive unit 30a. In the power-saving mode, the switching frequencies of the power transistor can be reduced by means of the control and/or regulation unit 50a to a value lower than a normal switching frequency, because at the same time, a maximum rotational speed of the drive unit 30a in the power-saving mode can be lowered. An efficiency of the inverter and thus of the handheld power tool 10a can thus advantageously be increased because the power losses of the power electronics are reduced.

The handheld power tool 10a furthermore comprises at least one communication unit 72a for a transmission of electrical and/or electronic data to and/or from an external unit (not illustrated in any more detail here). The external unit may in this case be in the form of a vacuum cleaner. The handheld power tool 10a can be supplied with power by means of a plug socket arranged on the vacuum cleaner. Via the communication unit 72a, the vacuum cleaner detects a start of operation of the handheld power tool 10a and is thereby likewise activated. Furthermore, by means of the communication unit 72a, further handheld power tool characteristic variables can be transmitted to the vacuum cleaner. Thus, the vacuum cleaner can be activated by means of the control and/or regulation unit 50a via the communication unit 72a in a manner dependent on at least one handheld power tool characteristic variable. The communication unit 72a is preferably in the form of a wireless communication unit. In this case, the communication unit 72a may be in the form of a WLAN communication unit, a Bluetooth communication unit, a radio communication unit, an RFID communication unit, an NFC unit, an infrared communication unit, a mobile radio network communication unit, a ZigBee communication unit or the like. The communication unit 72a is particularly preferably provided for bidirectional data transmission. In an alternative embodiment, the communication unit 72a is in the form of a wired communication unit, for example a LAN communication unit, a USB communication unit, a power-line technology communication unit or the like. It is however also conceivable for the vacuum cleaner to have a current sensor which is provided for detecting a current intensity of the connected handheld power tool 10a. Based on the detected current intensity, it is for example possible for a power level of the vacuum cleaner to be automatically adapted, or an operating mode of the vacuum cleaner is automatically selectable. A power-saving mode of the vacuum cleaner can be automatically activated in a manner dependent on a measured current intensity. In this case, the power-saving mode of the vacuum cleaner can be activated if a detected current intensity of the handheld power tool 10a connected to the vacuum cleaner does not change, or changes only by +/−5% for at least 2.5 seconds. Upon activation of the power-saving mode of the vacuum cleaner, a power level can be restricted in order to save power. If a change in the current intensity by at least 15% is detected, a power level of the vacuum cleaner can be increased.

The individual states and/or operating modes of the handheld power tool 10a can be output to an operator by means of the indication unit 20a. It is thus possible for the state of the handheld power tool 10a to be indicated to an operator in a convenient manner. A high level of operating convenience can thus advantageously be achieved.

FIGS. 3 to 7 show further exemplary embodiments of the disclosure. The following description and the drawing are restricted substantially to the differences between the exemplary embodiments, wherein, with regard to components of identical designation, in particular with regard to components with the same reference signs, reference can basically also be made to the drawing and/or the description of the other exemplary embodiments, in particular FIGS. 1 and 2. To distinguish between the exemplary embodiments, the alphabetic character a has been added as a suffix to the reference signs of the exemplary embodiment in FIGS. 1 and 2. In the exemplary embodiments of FIGS. 3 to 7, the alphabetic character a has, in accordance with the exemplary embodiment, been replaced with an alphabetic character from the alphabetic character sequence b to f.

Figure 3:
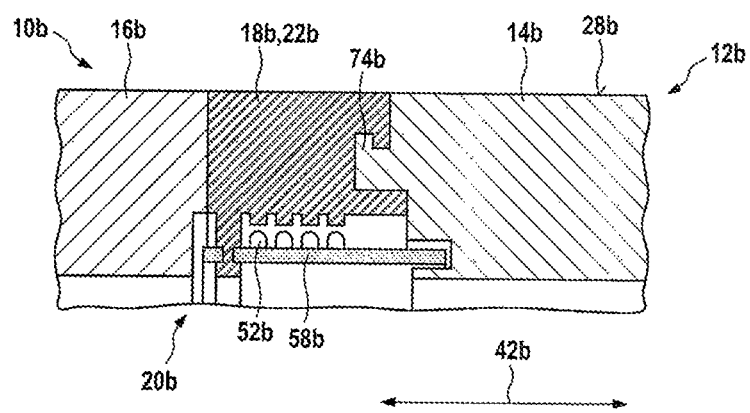
FIG. 3 is a schematic illustration, in a detail view, of an alternative indication unit which comprises an indication element fastened by means of cohesion and/or by means of positive locking and/or non-positively locking.

FIG. 3 shows an alternative embodiment of an electrical and/or electronic indication unit 20b. The electrical and/or electronic indication unit 20b is in this case part of a handheld power tool 10b (only partially illustrated). The handheld power tool 10b has a design at least substantially analogous to the handheld power tool 10a described in the description of FIGS. 1 and 2. Thus, the handheld power tool 10b comprises at least one housing unit 12b, which has at least one housing element 14b, at least one further housing element 16b and at least one housing connecting element 18b which connects the housing element 14b and the further housing element 16b to one another, and at least the electrical and/or electronic indication unit 20b, which has at least one at least partially circumferentially arranged indication element 22b for indicating at least one handheld power tool characteristic variable. The housing element 14b is in this case in the form of a motor housing of the handheld power tool 10b. The further housing element 16b is in the form of a gearing housing of the handheld power tool 10b. The indication element 22b is formed at least partially integrally with the housing connecting element 18b. In this case, the indication element 22b forms the housing connecting element 18b. Thus, the housing element 14b is fixed to the further housing element 16b by means of the indication element 22b. For this purpose, to connect the housing element 14b and the further housing element 16b, the indication element 22b is cohesively connected to the housing element 14b. The indication element 22b is cohesively fixed to the housing element 14b by means of a two-component injection molding process. In this case, the housing element 14b has at least one cohesion holding projection 74b around which the indication element 22b is molded. Furthermore, to connect the housing element 14b and the further housing element 16b, the indication element 22b is cohesively fixed to the further housing element 16b. In this case, the indication element 22b may be cohesively connected to the further housing element 16b by means of an adhesive bonding process, by means of an injection molding process, by means of a welding process, or the like. It is however also conceivable for the indication element 22b to alternatively have at least one fixing projection which is provided for positively locking and/or non-positively locking connection to the further housing element 16b. With regard to further features and functions of the handheld power tool 10b and/or of the indication unit 20b, reference can be made to the handheld power tool 10a and/or indication unit 20a described in the description of FIGS. 1 and 2.

Figure 4:
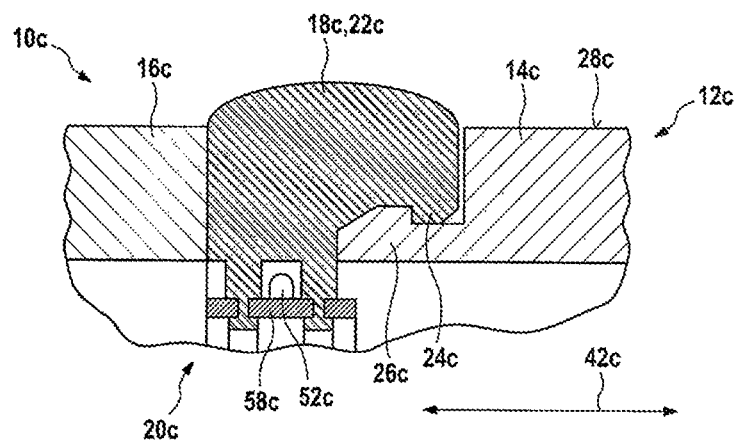
FIG. 4 is a schematic illustration, in a detail view, of a further alternative indication unit which comprises an indication element fastened by means of at least one detent connection.

FIG. 4 shows an alternative embodiment of an electrical and/or electronic indication unit 20c. The electrical and/or electronic indication unit 20c is in this case part of a handheld power tool 10c (only partially illustrated). The handheld power tool 10c has a design at least substantially analogous to the handheld power tool 10a described in the description of FIGS. 1 and 2. Thus, the handheld power tool 10c comprises at least one housing unit 12c, which has at least one housing element 14c, at least one further housing element 16c and at least one housing connecting element 18c which connects the housing element 14c and the further housing element 16c to one another, and at least the electrical and/or electronic indication unit 20c, which has at least one at least partially circumferentially arranged indication element 22c for indicating at least one handheld power tool characteristic variable. The housing element 14c is in this case in the form of a motor housing of the handheld power tool 10c. The further housing element 16c is in the form of a gearing housing of the handheld power tool 10c. The indication element 22c is formed at least partially integrally with the housing connecting element 18c. In this case, the indication element 22c forms the housing connecting element 18c. Thus, the housing element 14c is fixed to the further housing element 16c by means of the indication element 22c. To connect the housing element 14c and the further housing element 16c, the indication element 22c can be fixed to the housing element 14c in positively locking and/or non-positively locking fashion. For this purpose, the indication element 22c has at least one positive-locking projection 24c which, to fix the housing element 14c and the further housing element 16c, interacts with a corresponding positive-locking projection 26c of the housing element 14c. In this case, the positive-locking projection 24c of the indication element 22c is in the form of a detent hook. In this case, the positive-locking projection 24c of the indication element 22c is of resiliently elastic form. Thus, the indication element 22c can be detachably connected to the housing element 14c by means of the positive-locking projection 24c of the indication element 22c. Furthermore, the indication element 22c is connected cohesively to the further housing element 16c. With regard to further features and functions of the handheld power tool 10c and/or of the indication unit 20c, reference can be made to the handheld power tool 10a and/or indication unit 20a described in the description of FIGS. 1 and 2.

Figure 5:
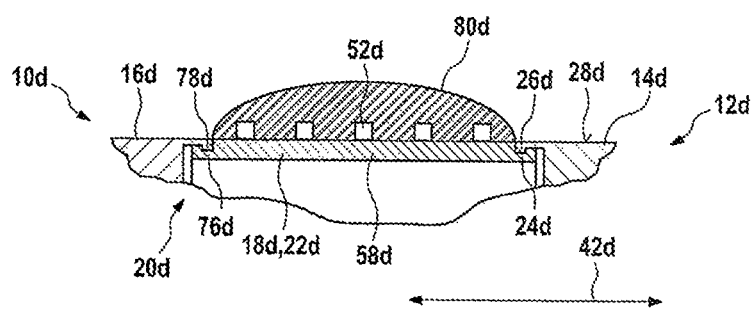
FIG. 5 is a schematic illustration, in a detail view, of a further alternative indication unit which comprises an indication element in the form of a graphic indication element.

FIG. 5 shows an alternative embodiment of an electrical and/or electronic indication unit 20d. The electrical and/or electronic indication unit 20d is in this case part of a handheld power tool 10d (only partially illustrated). The handheld power tool 10d has a design at least substantially analogous to the handheld power tool 10a described in the description of FIGS. 1 and 2. Thus, the handheld power tool 10d comprises at least one housing unit 12d, which has at least one housing element 14d, at least one further housing element 16d and at least one housing connecting element 18d which connects the housing element 14d and the further housing element 16d to one another, and at least the electrical and/or electronic indication unit 20d, which has at least one at least partially circumferentially arranged indication element 22d for indicating at least one handheld power tool characteristic variable. The housing element 14d is in this case in the form of a motor housing of the handheld power tool 10d. The further housing element 16d is in the form of a gearing housing of the handheld power tool 10d.

The indication element 22d is formed at least partially integrally with the housing connecting element 18d. In this case, the indication element 22d forms the housing connecting element 18d. To connect the housing element 14d and the further housing element 16d, the indication element 22d can be fixed to the housing element 14d and to the further housing element 16d in positively locking and/or non-positively locking fashion. For this purpose, the indication element 22d has at least one positive-locking projection 24d which, to fix the housing element 14d and the further housing element 16d, interacts with a corresponding positive-locking projection 26d of the housing element 14d. In this case, the positive-locking projection 24d of the indication element 22d is in the form of a detent hook. In this case, the positive-locking projection 24d of the indication element 22d is of resiliently elastic form. Thus, the indication element 22d can be detachably connected to the housing element 14d by means of the positive-locking projection 24d of the indication element 22d. The positive-locking projection 26d of the housing element 14d may in this case be formed as a detent recess, as a corresponding detent hook or some other detent element that appears expedient to a person skilled in the art. Furthermore, the indication element 22d has at least one further positive-locking projection 24d which, to fix the housing element 14d and the further housing element 16d, interacts with a corresponding positive-locking projection 78d of the further housing element 16d. The further positive-locking projection 76d of the indication element 22d is in this case in the form of a detent hook. In this case, the further positive-locking projection 76d of the indication element 22d is of resiliently elastic form. Thus, the indication element 22d can be detachably connected to the further housing element 16d by means of the further positive-locking projection 76d of the indication element 22d. In this case, the positive-locking projection 78d of the further housing element 16d may be formed as a detent recess, as a corresponding detent hook or some other detent element that appears expedient to a person skilled in the art.

The indication element 22d is in the form of an electrical and/or electronic graphic indication element. In this case, the electrical and/or electronic graphic indication element is of at least five-line configuration. The indication element 22d thus comprises at least one printed circuit board 58d and at least one luminous element 52d. Altogether, the indication element 22d in the form of an electrical and/or electronic graphic indication element comprises a multiplicity of luminous elements 52d which are arranged on the printed circuit board 58d. In this case, the luminous elements 52d together form at least five lines of the indication element 22d, which is in the form of an electrical and/or electronic graphic indication element. The positive-locking projection 24d and the further positive-locking projection 76d of the indication element 22d are also arranged on the printed circuit board 58d. The printed circuit board 58d is in the form of a flexible printed circuit board. Furthermore, the indication element 22d has at least one protective element 80d. The protective element 80d is provided in particular for protecting the luminous elements 52d and/or the printed circuit board 58d against damage and/or fouling. The protective element 80d is of transparent form. Thus, the luminous elements 52d are visible through the protective element 80d. In this case, the protective element 80d is formed as a silicone encapsulation. The protective element 80d may in this case be arranged only on that side of the printed circuit board 58d on which the luminous elements 52d are arranged, or the protective element 80d surrounds the entire printed circuit board 58d. When arranged on the housing unit 12d, the indication element 22d is in a circular ring-shaped configuration. With regard to further features and functions of the handheld power tool 10d and/or of the indication unit 20d, reference can be made to the handheld power tool 10a and/or indication unit 20a described in the description of FIGS. 1 and 2.

Figure 6:
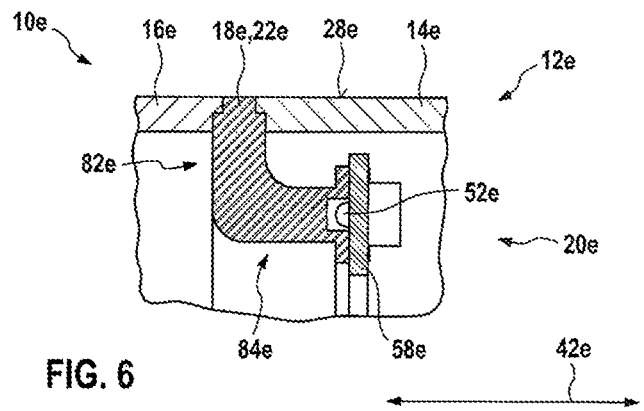
FIG. 6 is a schematic illustration, in a detail view, of a further alternative indication unit.

FIG. 6 shows an alternative embodiment of an electrical and/or electronic indication unit 20e. The electrical and/or electronic indication unit 20e is in this case part of a handheld power tool 10e (only partially illustrated). The handheld power tool 10e has a design at least substantially analogous to the handheld power tool 10a described in the description of FIGS. 1 and 2. Thus, the handheld power tool 10e comprises at least one housing unit 12e, which has at least one housing element 14e, at least one further housing element 16e and at least one housing connecting element 18e which connects the housing element 14e and the further housing element 16e to one another, and at least the electrical and/or electronic indication unit 20e, which has at least one at least partially circumferentially arranged indication element 22e for indicating at least one handheld power tool characteristic variable. The housing element 14e is in this case in the form of a motor housing of the handheld power tool 10e. The further housing element 16e is in the form of a gearing housing of the handheld power tool 10e. The indication element 22e is formed at least partially integrally with the housing connecting element 18e. In this case, the indication element 22e forms the housing connecting element 18e. To connect the housing element 14e and the further housing element 16e, the indication element 22e can be fixed to the housing element 14e and/or to the further housing element 16e in positively locking and/or non-positively locking fashion.

The indication element 22e is of circular ring-shaped form. Furthermore, the indication element 22e has at least two circular ring leg regions 82e, 84e which are angled relative to one another. One of the circular ring leg regions 82e, 84e extends at least substantially parallel to a main extent direction 42e of the handheld power tool 10e, and one of the circular ring leg regions 82e, 84e extends at least substantially perpendicular to the main extent direction 42e of the handheld power tool 10e. Thus, one of the circular ring leg regions 82e, 84e can be fixed in positively locking and/or non-positively locking fashion to the housing element 14e, and/or to the further housing element 16e, and the other of the circular ring leg regions 82e, 84e can be connected to a printed circuit board 58e of the indication unit 20e, on which at least one luminous element 52e of the indication unit 20e is arranged for the purpose of illuminating the indication element 22e. With regard to further features and functions of the handheld power tool 10e and/or of the indication unit 20e, reference can be made to the handheld power tool 10a and/or indication unit 20a described in the description of FIGS. 1 and 2.

Figure 7:
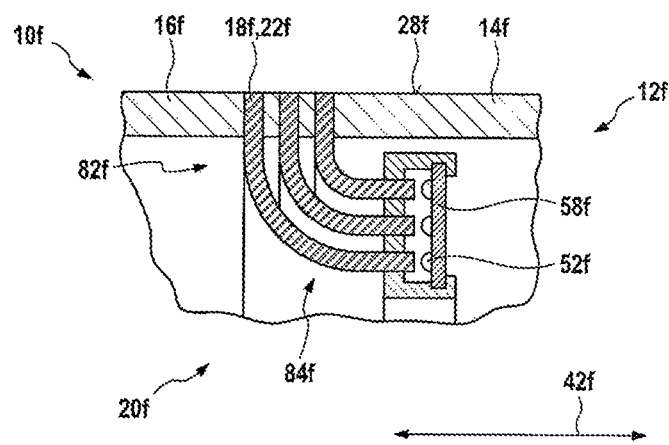
FIG. 7 is a schematic illustration, in a detail view, of a further alternative indication unit.

FIG. 7 shows an alternative embodiment of an electrical and/or electronic indication unit 20f. In this case, the electrical and/or electronic indication unit 20f has a design at least substantially analogous to the electrical and/or electronic indication unit 20e described in the description of FIG. 6. By contrast to the electrical and/or electronic indication unit 20e described in the description of FIG. 6, the electrical and/or electronic indication unit 20f has a multiplicity of indication elements 22f which are of circular ring-shaped form and which each have at least two circular ring leg regions 82f, 84f which are angled relative to one another. The multiplicity of indication elements 22f forms, in particular together with a printed circuit board 58f of the indication unit 20f and the luminous elements 52f arranged thereon, an electrical and/or electronic graphic indication element of the indication unit 20f. In this case, it is conceivable for the indication elements 22f to extend individually through recesses in a housing element 14f and/or in a further housing element 16f, or to be connected to one another by means of an indication element accommodating element of the indication unit 20f in order to connect the housing element 14f and/or the further housing element 16f. With regard to further features and functions of the handheld power tool 10f and/or of the indication unit 20f, reference can be made to the handheld power tool 10a and/or indication unit 20a described in the description of FIGS. 1 and 2.

What is claimed is:

1. A handheld power tool, comprising:
   at least one housing unit having at least one housing element, at least one further housing element, and at least one housing connecting element that connects the housing element and the further housing element to one another; and
   at least one electrical and/or electronic indication unit that has at least one at least partially circumferentially arranged indication element configured to indicate at least one handheld power tool characteristic variable,
   wherein the indication element is formed at least partially integrally with the housing connecting element.

2. The handheld power tool according to claim 1, wherein, to connect the housing element and the further housing element, the indication element is fixable in positively locking and/or non-positively locking fashion to one or more of the housing element and the further housing element.

3. The handheld power tool according to claim 2, wherein the indication element has at least one positive-locking projection which, to fix the housing element and the further housing element, interacts with a corresponding positive-locking projection of the one or more of the housing element and the further housing element.

4. The handheld power tool according to claim 1, wherein, to connect the housing element and the further housing element, the indication element is fixed cohesively to one or more of the housing element and the further housing element.

5. The handheld power tool according to claim 1, wherein the indication element abuts the housing element and the further housing element on opposite sides of the indication element when viewed along a direction running at least substantially perpendicular to a connecting direction of the housing unit.

6. The handheld power tool according to claim 1, wherein the indication element is configured as an electrical and/or electronic graphic indication element.

7. The handheld power tool according to claim 6, wherein the electrical and/or electronic graphic indication element is of at least five-line configuration.

8. The handheld power tool according to claim 1, wherein the indication element is arranged on the housing unit close to an output.

9. The handheld power tool according to claim 1, wherein the indication element extends around the housing unit over at least 25% of a maximum overall circumferential extent of the housing unit.

10. The handheld power tool according to claim 1, wherein the indication element terminates at least substantially flush with an outer surface of the housing unit.

* * * * *